United States Patent [19]

Eikelmann

[11] 4,367,809
[45] Jan. 11, 1983

[54] APPARATUS FOR CONVEYING RUBBLE

[76] Inventor: Reinhard Eikelmann, Buchengrund 10, 4955 Hille 1, Fed. Rep. of Germany

[21] Appl. No.: 185,987

[22] Filed: Sep. 10, 1980

[30] Foreign Application Priority Data

Sep. 11, 1979 [DE] Fed. Rep. of Germany ....... 2936594

[51] Int. Cl.³ .................... B65G 11/00; E04F 17/12
[52] U.S. Cl. ......................................... 182/48; 182/59;
  182/82; 193/2 R
[58] Field of Search ....................... 182/82, 48, 57, 58,
  182/83; 14/71.5; 193/2 R, 25 R

[56] References Cited

U.S. PATENT DOCUMENTS

| 268,132 | 11/1882 | Sandvos | 182/57 |
| 813,139 | 2/1906 | Brown et al. | 182/48 |
| 2,436,713 | 2/1948 | Cody | 182/58 |
| 2,491,621 | 12/1949 | Roos | 182/58 |
| 3,679,026 | 7/1972 | Hansen | 182/82 |
| 4,005,762 | 2/1977 | Zephinie | 182/48 |
| 4,280,243 | 7/1981 | Durrant | 182/82 |

FOREIGN PATENT DOCUMENTS

| 744950 | 1/1933 | France | 182/58 |
| 959745 | 10/1949 | France | 182/58 |

Primary Examiner—Reinaldo P. Machado
Attorney, Agent, or Firm—Kenyon & Kenyon

[57] ABSTRACT

The apparatus is constructed with upright supports and contilevers which project from the supports. The cantilevers carry a suspension device for supporting a rubble chute as well as a foldable U-shaped tray which defines a walkway for access to the chute. The cantilevers are constructed of horizontal tie bars and diagonal struts which can be detachably connected from the upright supports.

4 Claims, 3 Drawing Figures

APPARATUS FOR CONVEYING RUBBLE

The invention relates to conveyor apparatus for rubble.

Rubble chutes are advantageously used in the construction industry for the construction or alteration of buildings in order to make possible a simple removal of rubble which is acceptable from an environmental point of view because of its low dust development, especially from higher stories.

It is known to arrange, for this purpose, vertical tubes in a scaffolding which is constructed in front of the outer facade of the building and which are charged with the rubble by means of shoveling or, if the scaffolding has a suitable platform on the loading side, by means of wheel barrows or the like. At the discharge end of the rubbish chute, an inclined discharge chute is normally arranged for loading the material on trucks or into containers.

The above-mentioned construction, however, requires the erection of a scaffolding on the facade of the building and is uneconomical because of the costs connected therewith, a point which is particularly important in the case of interior alterations of buildings. In these cases, existing landscaping and plantings also suffer heavily from the erection of the scaffolding. A further disadvantage manifests itself when rubble is removed from large-area building complexes. Since it is not possible to change the location of the scaffolding and the rubbish chute mounted therein without extensive disassembly and assembly work and is therefore not carried out, the rubble must be transported within the building sometimes over long distances.

It has also been known in the construction industry to use rubble pipes which engage each other in funnel-fashion to remove rubble. In use, these pipes are connected to each other by means of chains or cables and are suspended from suspension devices mounted outside or inside the building.

The advantage of the rubble pipes is that no scaffolding is required. Further, this protective pipe chain is flexible in the longitudinal axis. It is a disadvantage, however, that additional anchor points are required for the suspension at the building, and lifting devices are required within the building for pulling it up. In addition, charging with rubble can only be done by shoveling since no working platform is arranged in the loading area on which wheel barrows or the like can be wheeled.

Accordingly, it is an object of the invention to provide a conveyor apparatus for rubble that can be disassembled and is transportable, can be attached to buildings simply and fast, without the use of additional auxiliary devices and without additional anchoring points, and that is accessible and loadable without danger with hand-pushed horizontal conveyor equipment.

Briefly, the invention provides an apparatus for conveying rubble which is comprised of a pair of spaced upright supports, an upper cross-piece which is detachably connected to the supports, a pair of tensioning arms which extend outwardly of the supports, a pair of downwardly-directed support legs which are movably mounted on the tensioning arms and a cross-piece which is detachably connected to the support legs. In addition, a pair of cantilevers extend outwardly from the supports with each cantilever being detachably connected to a respective support. Further, a suspension device for supporting a rubble chute is connected to the cantilevers, pulling devices are mounted on the cantilevers for raising and lowering the suspension device and a foldable tray is suspended from the cantilevers to define a walkway.

The advantages obtained by the apparatus are substantially that the individual parts of the structure for suspending the rubble chute can be transported within the building without the use of additional auxiliary means and can be assembled, erected and clamped in the building at the intended site quickly and simply; that the rubble chute assembled on the ground outside the building can be pulled-up by means of pulling devices connected to the structure; and that the tray which can be hung into the structure makes possible the loading of rubble via wheel barrows or the like without the danger of accidents. The point of use can be changed without time-consumming disassembly and assembly work, so that the transport distances can be kept small in large-area building complexes.

So as to have better adaptability to the structural situation, it is advantageous to have the cantilevers and tensioning arms detachably connected to guide sleeves which can be moved and locked on the supports. Further, the supports may be made variable in length. In addition, the rubble chute may be constructed with a funnel having a gimbel joint for suspension from the suspension device so that it is possible to displace the discharge end of the rubble chute relative to the vertical axis going through the charging end, so that the location of the transport vehicle removing the rubble can be chosen independently of the charging end.

These and other objects and advantages of the invention will become more apparent from the following detailed description taken in conjunction with the accompanying drawings wherein.

Figure 1:
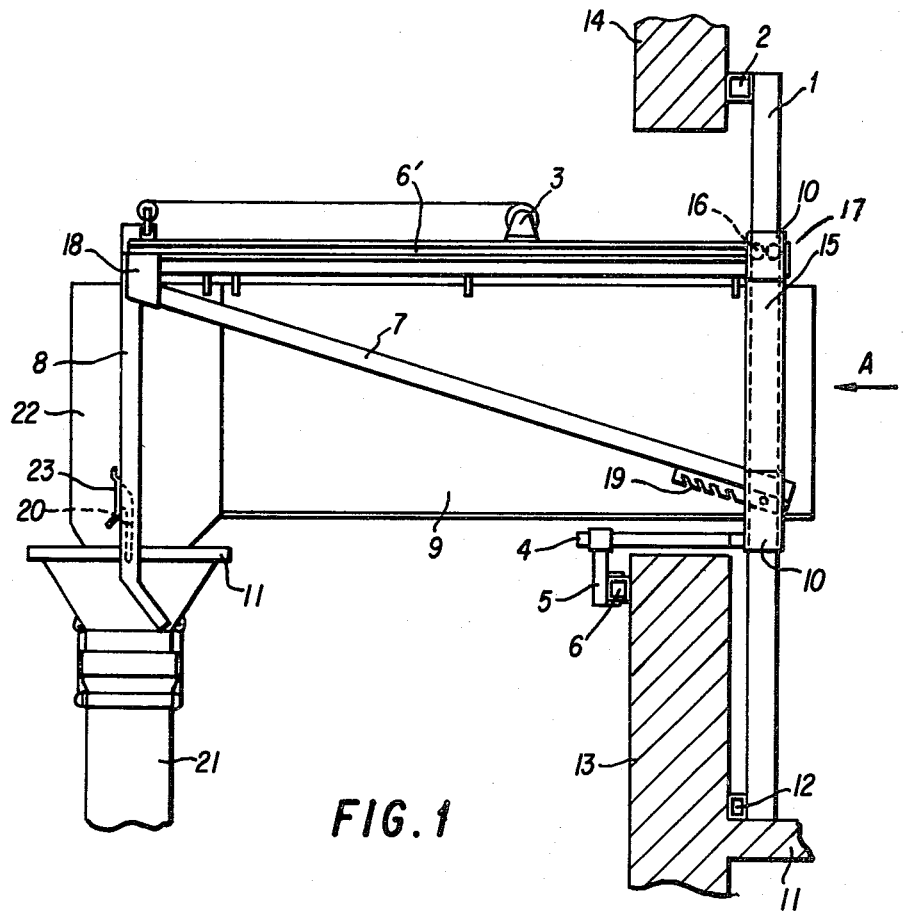
FIG. 1 illustrates a side view of an apparatus constructed in accordance with the invention.
Figure 3:
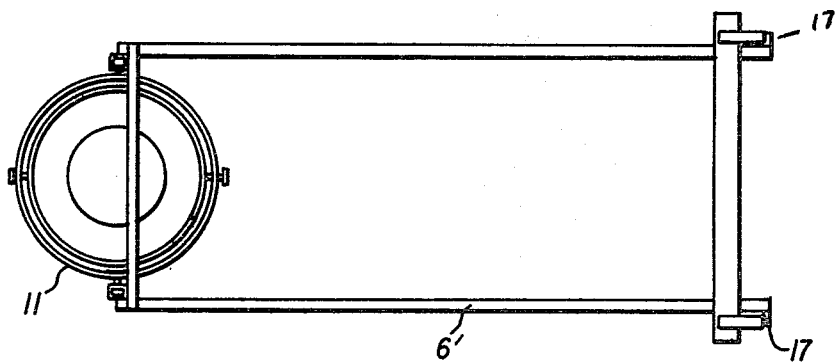
FIG. 3 illustrates a top view of the apparatus of FIG. 1.
Figure 2:
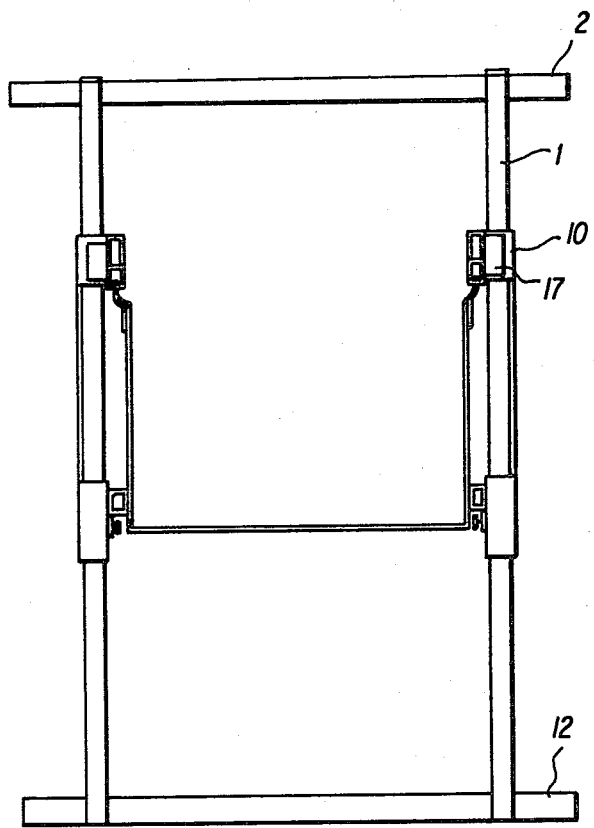
FIG. 2 illustrates a view taken in the direction by the arrow A in FIG. 1.

Referring to FIGS. 1 to 3, the apparatus includes two parallel supports 1 which are spaced from each other in the interior of a building in front of a building opening, for instance, a window. The supports 1 are arranged to stand upright on a floor 11 and are detachably connected to each other at their upper and lower ends by cross pieces 2 and 12. Each of the supports 1, which are advantageously made of square tubing, is provided with two guide sleeves 10 which are connected to each other by a strap 15 and can be locked at any desired height, for instance, by a clamping screw (not shown). A tensioning arm 4 is pivotally linked to each of the lower guide sleeves 10 to pivot within certain limits about a horizontal axis. Each tensioning arm 4 protrudes from the building an carries a support leg 5 is movably supported and which can be locked by means of a clamping screw. The lower ends of the support legs 5 which are detachably connected a cross piece 6. The supports 1 are held in front of the building by means of the tension arms 4 and the support legs 5, and are braced via the cross piece 2 on the inside at a lintel 14 and via the cross piece 6 from the outside against a railing 13. Since the guide sleeves 10 are movable, the height of the tensioning arms 4 can be adapted to the height of the railing 13.

As shown, cantilevers are detachably connected to the guide sleeves 10. Each cantilever is formed by a tie bar 6' and a diagonal pressure strut 7. The tie bar 6' is composed of two square tubes, of which the upper is slotted laterally and the lower one toward the bottom. The tie bar 6' is supported on two rollers 16 which lie within the upper square tube and are rotatably supported on bolts connected to the upper guide sleeve 10, and rests against the guide sleeve 10 with a stop 17. The pressure diagonal strut 7 is disposed with the front end in a pocket 18 connected to the tie bar 6' and is braced with the rear end at a bolt connected to the lower guide sleeve 10 via a detent bar 19.

This detent bar 19 makes it possible to vary the inclination of the tension bar 6' relative to the support 1 so that this device can also be attached to inclined building parts, for instance, roofs. The front end of the diagonal pressure strut 7 is provided with a T-shaped attachment which extends into the lower slot of the tie bar 6'. A U-shaped suspension device 8 with vertical legs is detachably connected to the tie bars 6' of the cantilever. Each leg also has a flap 23 thereon for purposes as explained below.

A gimbal joint of a funnel 11, from which a rubble tube chain or chute 21 is suspended, hangs in pockets 20 of the vertical legs of the suspension device 8. Hand-operated pulling devices such as winches 3 are mounted on the tie bars 6' for raising and lowering the tube chain 21 and funnel 11. A foldable U-shaped tray 9 as well as a protective hood 22 are hung from the lower slots of the tie bars 6'. The tray 9 serves to define a walkway.

The apparatus described above is easy to assemble. After the individual parts have been transported within the building to the site of use, the supports 1, guide sleeves 10, tensioning arms 4, support legs 5, and cross-pieces 2, 6, 12 are assembled in front of the building opening on the floor of the building, are erected and clamped to the building. Thereupon, the tie bars 61 are run out from the building on the rollers 16 up to the stop 17. The pressure strut 7 is hung with its T-shaped attachment into the lower slot of the tie bar 6; advanced up to the pocket 8 and snapped-in at the bolt of the lower guide sleeve 10. Subsequently, the protective hood 22 and tray 9 are hung into the lower slots of the tie bars 6' and pushed into position. Now, the apparatus can be walked on without danger.

After the suspension device 8 is installed, the rubble chute 21 which is assembled in front of the building on the ground, including the funnels, can be lifted up by means of the manually operated winches 3. The sloped legs of the suspension device 8 serve to guide lateral pins of the gimbal joint. The pins slide along the legs, left the flaps 23 and can penetrate into the pockets 20 unimpeded. The rubble chute 21 is then lowered until it hangs freely in the pockets.

The flaps 23 serve to hang-out the rubble chute 21 automatically. For disassembling, the rubble chute 21 is first lifted up further. The pins of the gimbal joint lift the flaps 23 and slide along them. After the rubble chute 21 is lifted according to the length of the flaps, these flip over and cover up the pockets 20 so that in lowering, the pins cannot drop into the pockets again.

I claim:

1. An apparatus for conveying rubble comprising
a pair of spaced upright supports;
an upper cross-piece detachably connected to said supports;
a pair of tensioning arms, each said arm extending outwardly of a respective support;
a pair of downwardly-directed support legs, each said leg being movably mounted on a respective tensioning arm;
a second cross-piece detachably connected to said support legs;
a pair of cantilevers extending outwardly from said supports, each cantilever being detachably connected to a respective support;
a suspension device for supporting a rubble chute connected to said cantilevers;
pulling devices mounted on said cantilevers for raising and lowering said suspension device; and
a foldable tray suspended from said cantilevers to define a walkway.

2. An apparatus as set forth in claim 1 which further comprises a pair of guide sleeves movably mounted and releaseably locked on each respective support, and wherein each tensioning arm is connected to a respective sleeve and each cantilever is connected to a respective sleeve.

3. An apparatus as set forth in claim 1 wherein each support is variable in length.

4. An apparatus as set forth in claim 1 which further comprises a rubble chute having a funnel with a gimbal joint for suspension from said suspension device.

* * * * *

UNITED STATES PATENT AND TRADEMARK OFFICE
CERTIFICATE OF CORRECTION

PATENT NO. : 4367809
DATED : January 11, 1983
INVENTOR(S) : Reinhard Eikelmann

It is certified that error appears in the above—identified patent and that said Letters Patent is hereby corrected as shown below:

Column 2, line 57, after "5" insert --which--;

Column 3, line 36, change "61" to --6'--;

" " " 39, change "6" to --6'--;

Column 4, line 4, change "left" to --lift--.

Signed and Sealed this

Fifth Day of April 1983

[SEAL]

Attest:

Attesting Officer

GERALD J. MOSSINGHOFF
Commissioner of Patents and Trademarks